United States Patent [19]

Wirt

[11] 4,126,235

[45] Nov. 21, 1978

[54] TREE HARVESTER CONTROL LINKAGE

[75] Inventor: Leon A. Wirt, Joliet, Ill.

[73] Assignee: Caterpillar Tractor Co., Peoria, Ill.

[21] Appl. No.: 784,877

[22] Filed: Apr. 5, 1977

[51] Int. Cl.² .............................................. B66C 1/68
[52] U.S. Cl. ........................................ 214/3; 212/44; 214/1 BD; 214/77 R; 214/147 G
[58] Field of Search ........... 214/147 R, 147 G, 138 R, 214/138 C, 138 D, 77 R, 1 BD, 1 BV; 212/42, 42.5, 44, 62

[56] References Cited

U.S. PATENT DOCUMENTS 3,414,146  12/1968  Caywood .......................... 214/138 R
3,972,430   8/1976  Forslund .......................... 214/147 G

FOREIGN PATENT DOCUMENTS 1,025,305  4/1966  United Kingdom ................ 214/138 R Primary Examiner—Albert J. Makay
Assistant Examiner—George F. Abraham
Attorney, Agent, or Firm—Phillips, Moore, Weissenberger, Lempio & Majestic

[57] ABSTRACT

A linkage associated with a boom and stick arm of a vehicle includes struts mounted to the boom and stick arm, links mounted to the stick arm, an implement pivotally mounted to the stick arm, and a cylinder interconnecting the struts and links for providing that as the stick arm is moved relative to the boom, the implement maintains a chosen attitude.

4 Claims, 2 Drawing Figures

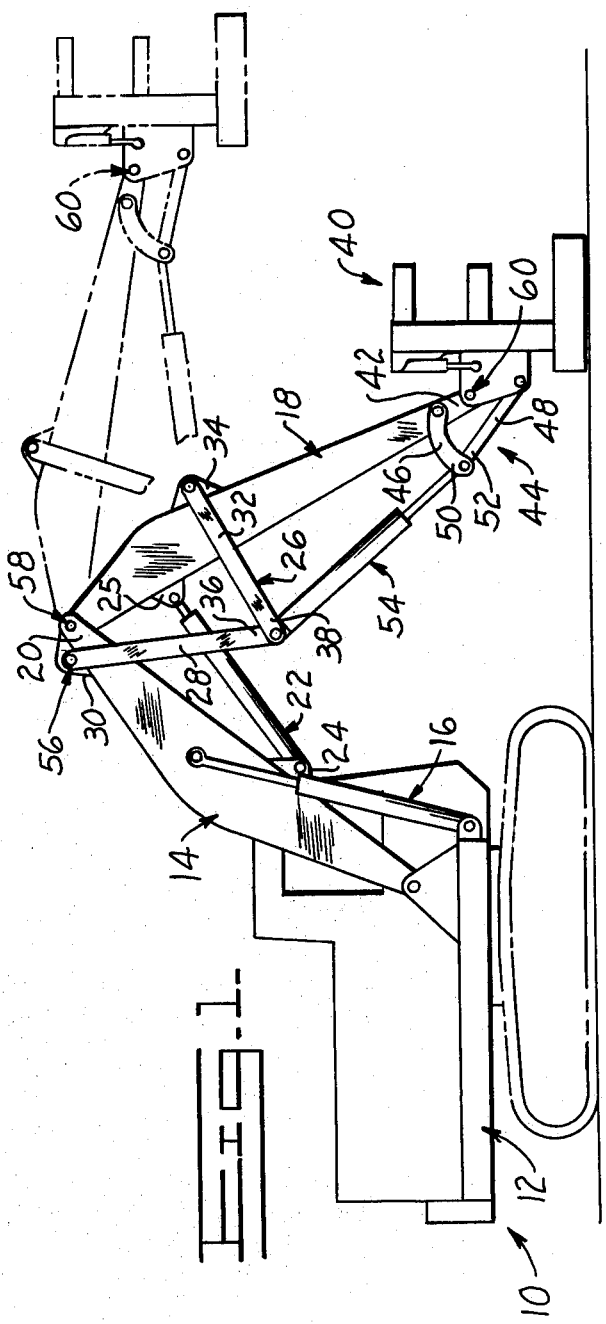
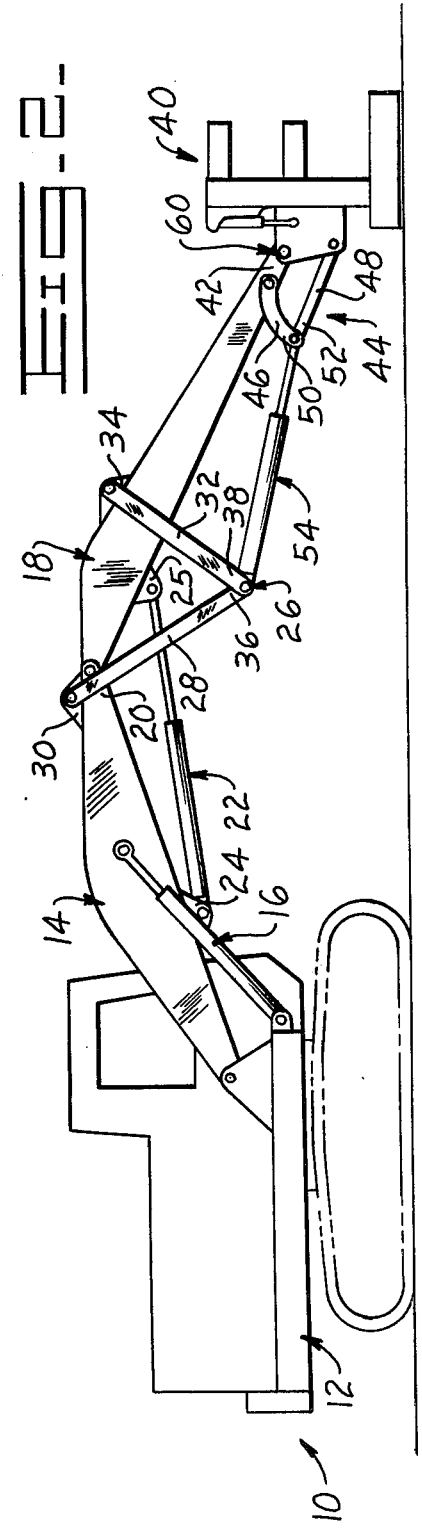

TREE HARVESTER CONTROL LINKAGE

BACKGROUND OF THE INVENTION

This invention relates to linkage means for an implement, and more particularly, to linkage means for controlling movement of a tree harvester head.

In a known system, a boom is pivotally mounted relative to a vehicle, with a stick arm in turn pivotally mountd to the boom, and a tree harvester head pivotally mounted to the end of the stick arm. A cylinder interconnects the vehicle and boom for raising and lowering the boom, and a cylinder interconnects the boom and stick arm for providing relative movement therebetween. yet another cylinder has one end pivotally connected relative to the stick arm, and the other end extends to a pair of links operatively connected with the tree harvester head so that actuation of this cylinder moves the tree harvester head relative to the stick arm.

It has been found that, in such a system, once the attitude of the tree harvester head is chosen by appropriate manipulation of the controls of the cylinders, extension and retraction of only the cylinder interconnecting the boom and stick arm results in a variation in the attitude of such tree harvester head. In order to avoid such a change in attitude, actuation of the cylinder interconnecting the stick arm and tree harvester head is necessary.

It is to be understood that, under certain conditions, it would be desirable that the tree harvester head maintain a certain approximate attitude as chosen even though the stick arm is moved relative to the boom, avoiding the necessity of actuating the cylinder interconnecting the stick arm and tree harvester head to maintain a chosen tree harvester head attitude.

Of general interest in this area is U.S. Pat. No. 2,870,924 to Wills, including a boom, a stick arm, a bucket, and cylinders operatively associated therewith.

SUMMARY OF THE INVENTION

It is accordingly an object of this invention to provide a control linkage arrangement for a tree harvester head associated with a boom and stick arm, wherein the tree harvester head maintains a chosen attitude upon actuation of a cylinder interconnecting the stick arm and boom for relative movement therebetween.

It is a further object of this invention to provide a control linkage which, while fulfilling the above object, is extremely efficient in design.

Broadly stated, the invention comprises a control linkage for an implement comprising a boom, and a stick arm pivotally connected relative to the boom. First cylinder means interconnect the boom and stick arm for selectively pivoting the stick arm relative to the boom. Further included are struct means comprising a first strut pivotally connected relative to the boom, and a second strut pivotally connected relative to the stick arm, extending ends of the first and second struts being pivotally secured together. An implement arm is pivotally connected relative to an extended end of the stick arm. Further included are link means comprising a first link pivotally connected relative to the stick arm adjacent the extended ends thereof, and a second link pivotally connected relative to the implement, extending ends of the first and second links being pivotally secured together. Second cylinder means interconnect the strut means and link means, the strut means and link means and second cylinder means providing that a chosen attitude of the implement is generally maintained upon actuation of the first cylinder means. When the first cylinder means is at least substantially fully extended, the pivotal connections between the first strut and boom, the stick arm and boom, and the implement and stick arm generally lie along a straight line.

BRIEF DESCRIPTION OF THE DRAWINGS

These and other objects of the invention will become apparent from a study of the following specification and drawings, in which:

FIG. 1 is a side elevation of a vehicle incorporating the invention; and

FIG. 2 is a view similar to that shown in FIG. 1, but with the boom and stick arm thereof in different positions.

DESCRIPTION OF THE PREFERRED EMBODIMENTS

Shown in FIGS. 1 and 2 is a track-type vehicle 10. The frame 12 of the vehicle 10 has pivotally mounted thereto a boom 14 and a cylinder 16 interconnects the boom 14 and frame 12 so that extension and retraction of the cylinder 16 pivots the boom 14 in one and the other directions relative to the vehicle 10. A stick arm 18 is pivotally connected to the extended end 20 of the boom 14. A cylinder 27 interconnects the boom 14 and stick arm 18 by means of brackets 24, 25 respectively fixed thereto, so that the stick arm 18 may be selectively pivoted relative to the boom 14.

Strut means 26 are associated with the boom 14 and stick arm 18. Such strut means 26 include a first strut 28 pivotally connected to a bracket 30 secured to the boom 14 adjacent the end 20 thereof, so as to be pivotable relative to the boom 14, and a second strut 32 pivotally connected to a bracket 34 secured to the stick arm 18 generally midway between the ends thereof so as to be pivotally connected relative to the stick arm 18. The first and second struts 28, 32 are angled downwardly toward each other, and the extending ends 36, 38 of the first and second struts 28, 32 are pivotally secured together.

A tree harvester head 40, including for example grapple arms and a blade for cutting a tree, is pivotally connected to the extended end 42 of the stick arm 18. Link means 44 are operatively connected with the stick arm 18 and the tree harvester head 40. Such link means 44 are made up of a first link 46 pivotally connected to the stick arm 18 adjacent the extended end 42 thereof, and a second link 48 is pivotally connected to the tree harvester head 40, the first and second links 46, 48 extending downwardly and having extending ends 50, 52 thereof pivotally secured together.

A cylinder 54 has its head end pivotally connected to the strut means 26 at the point where the first and second struts 32, 36 are pivotally secured together. The rod end of the cylinder 54 is pivotally connected to the link means 44 at a point where the first and second links 46, 48 are pivotally secured together.

With the linkage in the position shown in phantom in FIG. 1, that is, with the cylinder 22 substantially fully extended, the pivotal connection 56 of the first strut 28 and boom 14, the piivotal connection 58 of the stick arm 18 and boom 14, and the pivotal connection 60 of the tree harvester head 40 and stick arm 18 lie generally along a straight line.

Because of the particular configuration of such structure, once a particular attitude of tree harvester head 40 is chosen, along with a particular position of the boom 14, extension and retraction of the cylinder 22 results in raising and lowering of the tree harvester head 40, but with the tree harvester head 40 remaining in substantially the same attitude throughout its movement (see FIG. 1). That is, the cylinder 54 need not be actuated along with the cylinder 22, as in the previously described system wherein the cylinder 54 was pivotally connected relative to the stick arm 18, rather than to strut means 26.

FIG. 2 shows another boom position, which, as set forth above, once chosen, results in the fact that a harvester head attitude may be chosen which will be maintained upon actuation of the cylinder 22. It will be seen, therefore, that in the present system, the manipulation of individual controls by the operator of the vehicle for actuating the individual cylinders is relatively less than in the previously described system.

The embodiments of the invention in which an exclusive property or privilege is claimed are defined as follows:

1. a control linkage for an implement comprising:
   a boom;
   a stick arm pivotally connected relative to said boom;
   first cylinder means interconnecting said boom and stick arm for selectively pivoting the stick arm relative to the boom;
   strut means comprising a first strut pivotally connected relative to the boom, and a second strut pivotally connected relative to the stick arm, extending ends of the first and second struts being pivotally secured together;
   an implement pivotally connected relative to an extended endd of the stick arm;
   link means comprising a first link pivotally connected relative to the stick arm adjacent the extended end thereof, and a second link pivotally connected relative to the implement, extending ends of the first and second links being pivotally secured together; and
   second cylinder means interconnecting said strut means and link means;
   said strut means and link means and second cylinder means providing that a chosen attitude of the implement is generally maintained upon actuation of the first cylinder means, wherein, with the first cylinder means substantially fully extended, the pivotal connection of the first strut and boom, the pivotal connection of the stick arm and boom, and the pivotal connection of the implement and stick arm lie generally along a straight line.

2. The apparatus of claim 1 wherein the second cylinder means is connected to the strut means at a point where the first and second struts are pivotally secured together.

3. The apparatus of claim 2 wherein the second cylinder means is connectd to the link means at a point where the first and second links are pivotally secured together.

4. The apparatus of claim 3 wherein the implement means comprise a tree harvester head.